(12) United States Patent
Toiva

(10) Patent No.: US 10,894,590 B2
(45) Date of Patent: Jan. 19, 2021

(54) METHOD AND A CONTROL ARRANGEMENT FOR CONTROLLING VIBRATIONS OF A PROPULSION UNIT OF A VESSEL

(71) Applicant: ABB Oy, Helsinki (FI)

(72) Inventor: Jari Toiva, Vantaa (FI)

(73) Assignee: ABB Oy, Helsinki (FI)

( * ) Notice: Subject to any disclaimer, the term of this patent is extended or adjusted under 35 U.S.C. 154(b) by 155 days.

(21) Appl. No.: 16/302,823

(22) PCT Filed: May 18, 2016

(86) PCT No.: PCT/FI2016/050326
§ 371 (c)(1),
(2) Date: Nov. 19, 2018

(87) PCT Pub. No.: WO2017/198892
PCT Pub. Date: Nov. 23, 2017

(65) Prior Publication Data
US 2019/0300137 A1    Oct. 3, 2019

(51) Int. Cl.
*B63H 21/21* (2006.01)
*B63H 1/15* (2006.01)
(Continued)

(52) U.S. Cl.
CPC ............ *B63H 21/21* (2013.01); *B63B 71/00* (2020.01); *B63H 1/14* (2013.01); *B63H 1/15* (2013.01);
(Continued)

(58) Field of Classification Search
None
See application file for complete search history.

(56) References Cited

U.S. PATENT DOCUMENTS

| | | | |
|---|---|---|---|
| 5,126,641 A | * | 6/1992 | Putman ................ F16F 15/03 318/127 |
| 6,752,670 B2 | | 6/2004 | Geil |

(Continued)

FOREIGN PATENT DOCUMENTS

| | | |
|---|---|---|
| EP | 2194290 A2 | 6/2010 |
| EP | 2851280 A1 | 3/2015 |

(Continued)

OTHER PUBLICATIONS

Finnish Patent Office, International Search Report & Written Opinion issued in corresponding Application No. PCT/FI2016/050326, dated Aug. 18, 2016, 10 pp.

(Continued)

*Primary Examiner* — Peter D Nolan
*Assistant Examiner* — Demetra R Smith-Stewart
(74) *Attorney, Agent, or Firm* — Taft Stettinius & Hollister LLP; J. Bruce Schelkopf

(57) ABSTRACT

The propulsion unit includes a frame construction having an upper portion forming a support arm protruding from a hull of the vessel and a lower portion forming a longitudinal compartment provided with a propeller shaft having at least one propeller attached thereto, and a first electric motor driving the propeller shaft. The method includes measuring vibrations of the propulsion unit with at least one measuring device, forming a first auxiliary torque control signal based on the measured vibration signal, adding the first auxiliary torque control signal to a first torque control signal produced by a first torque controller of the first electric motor. The first auxiliary torque signal acts against the measured vibrations.

20 Claims, 4 Drawing Sheets

Figure 1:
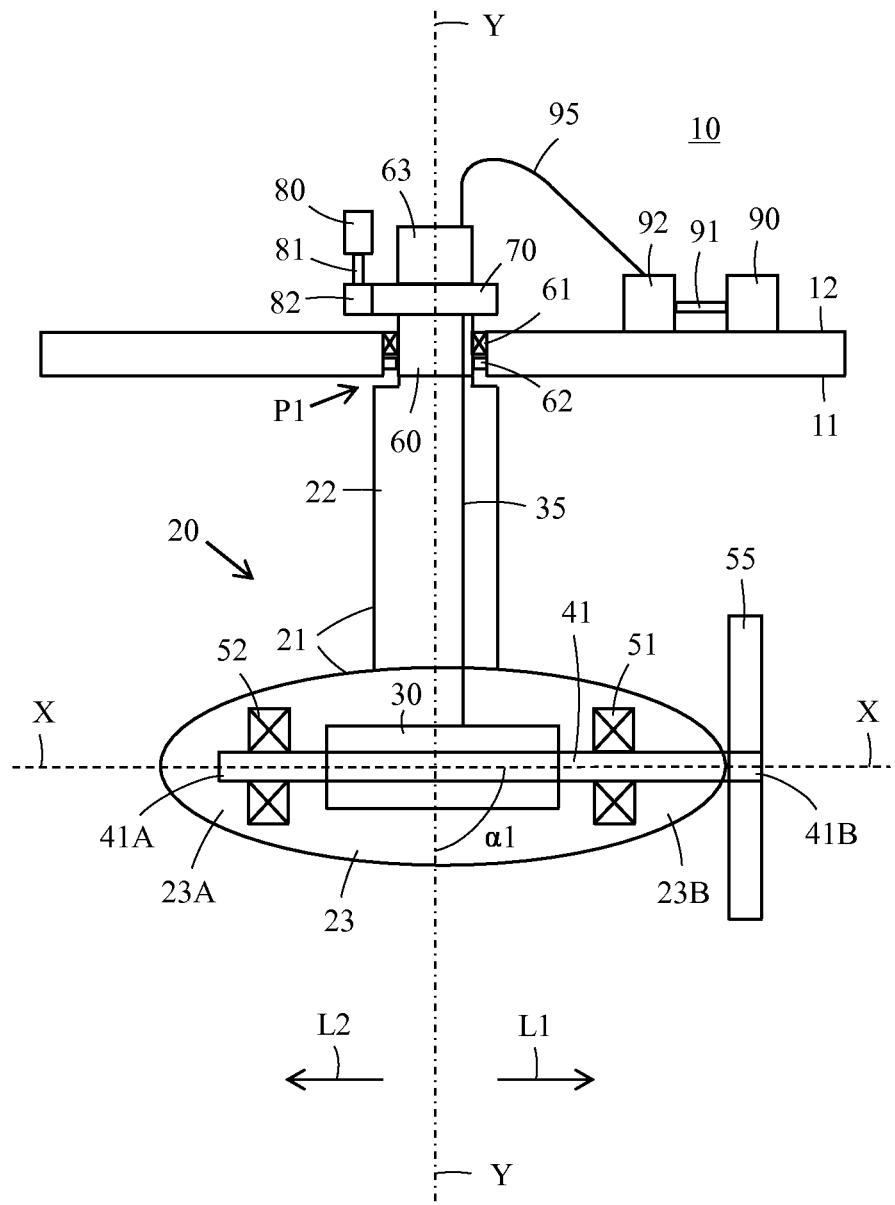

(51) Int. Cl.
  *B63H 1/14*  (2006.01)
  *B63H 21/17*  (2006.01)
  *B63J 99/00*  (2009.01)
  *G05D 19/02*  (2006.01)
  *F16F 15/00*  (2006.01)
  *F16F 15/02*  (2006.01)
  *B63B 71/00*  (2020.01)
  *B63H 5/125*  (2006.01)
  *B63B 79/00*  (2020.01)

(52) U.S. Cl.
  CPC .............. *B63H 21/17* (2013.01); *B63J 99/00* (2013.01); *F16F 15/002* (2013.01); *F16F 15/02* (2013.01); *G05D 19/02* (2013.01); *B63B 79/00* (2020.01); *B63H 5/125* (2013.01); *B63H 2005/1258* (2013.01); *B63H 2021/216* (2013.01)

(56) References Cited

U.S. PATENT DOCUMENTS

| | | | |
|---|---|---|---|
| 8,435,089 | B2 | 5/2013 | Gaudin |
| 8,892,281 | B2 | 11/2014 | Suzuki et al. |
| 2003/0203685 | A1 | 10/2003 | Sexton et al. |
| 2004/0009063 | A1* | 1/2004 | Polacsek ............... F03D 1/0608 416/1 |
| 2006/0232250 | A1 | 10/2006 | Sihler et al. |
| 2008/0194155 | A1* | 8/2008 | Gaudin .................... B63H 5/14 440/67 |
| 2010/0105259 | A1 | 4/2010 | Wejrzanowski et al. |
| 2010/0297896 | A1* | 11/2010 | Duncan ................ B63H 23/321 440/52 |
| 2012/0094557 | A1* | 4/2012 | Takase ................... B63H 20/12 440/53 |
| 2015/0100185 | A1 | 4/2015 | Kajava et al. |

FOREIGN PATENT DOCUMENTS

| | | |
|---|---|---|
| EP | 2944560 A1 | 11/2015 |
| GB | 2361757 A | 10/2001 |
| JP | H03168442 A | 7/1991 |
| JP | H10138988 A | 5/1998 |
| JP | 2003519592 A | 6/2003 |
| JP | 2007535440 A | 12/2007 |
| JP | 2012061937 A | 3/2012 |
| JP | 2015508734 A | 3/2015 |
| WO | 03065142 A1 | 8/2003 |

OTHER PUBLICATIONS

European Patent Office, Extended Search Report issued in corresponding Application No. 16902279.5, dated Dec. 20, 2019, 9 pp.
Japanese Patent Office, Office Action issued in corresponding Application No. JP 2018-560228, dated Jan. 9, 2020, 9 pp.

* cited by examiner

METHOD AND A CONTROL ARRANGEMENT FOR CONTROLLING VIBRATIONS OF A PROPULSION UNIT OF A VESSEL

FIELD

The present invention relates to a method and to a control arrangement for controlling vibrations of a propulsion unit of a vessel.

BACKGROUND

Active vibration control of a propulsion unit has in prior art solutions been achieved by one or several separate actuators that have been arranged to act on the propulsion unit in order to attenuate the vibrations. The vibrations have been measured with a suitable sensor and the actuator has been operated based on the vibration measurements in order to produce a counterforce to the vibrations.

Vibrations in a propulsion unit may originate from different sources. The periodic impulses originating from the rotating masses in the propulsion unit are the most important vibration sources. These impulses are caused by imbalances in the rotating masses and by the rotation of the propeller in the water. The blades of the propeller produce impulses on a blade frequency, which is calculated by multiplying the rotation speed of the propeller with the number of blades of the propeller. Also the water flow passing along the propulsion unit produces impulses. Further impulses are produced by the first electric motor and by the torque connection frequency when the torque controller controls the switches of the first power converter of the first electric motor. Also an adjacent propulsion unit may produce a periodic impulse to the propulsion unit. The propulsion unit will e.g. suffer from vibrations every time the propulsion unit is turned and exposed to an oblique water flow.

SUMMARY

An object of the present invention is an improved method and an improved control arrangement for controlling vibrations of a propulsion unit of a vessel.

The method for controlling vibrations of a propulsion unit of a vessel is defined in claim 1.

The control arrangement for controlling vibrations of a propulsion unit of a vessel is defined in claim 10.

The propulsion unit comprises:
a frame construction having an upper portion and a lower portion, the upper portion forming an outwards from a hull of the vessel protruding support arm, the lower portion forming a longitudinal compartment having a first end and a second opposite end,
a propeller shaft being positioned within the lower portion of the frame construction,
at least one propeller being attached to the propeller shaft,
a first electric motor driving the propeller shaft.

The method comprises:
measuring vibrations of the propulsion unit with at least one measuring device,
forming a first auxiliary torque control signal based on the measured vibration signal,
adding the first auxiliary torque control signal to a first torque control signal produced by a first torque controller of the first electric motor, the first auxiliary torque control signal acting against the measured vibrations in order to attenuate said vibrations.

The control arrangement comprises
at least one measuring device for measuring vibrations of the propulsion unit,
a first torque controller for producing a torque control signal to the first electric motor,
a first additional torque controller receiving as an input signal measured vibrations from the at least one measuring device,
a first active vibration controller for producing a first auxiliary torque control signal based on the measured vibration signals, whereby
the first auxiliary torque control signal is added to a first torque control signal produced by the first torque controller of the first electric motor, the first auxiliary torque control signal acting against the measured vibrations in order to attenuate said vibrations.

The development of vibrations are reduced and the developed vibrations are attenuated in the invention by using a novel method and arrangement for controlling vibrations of a propulsion unit of a vessel. The vibrations of the propulsion unit may be measured with at least one measuring device and the output signal of the at least one measuring device may be filtered in order to produce a first auxiliary torque control signal which may be added to a first torque control signal produced by the first torque controller of the first electric motor. The first auxiliary torque control signal produces an action in an opposite direction to the measured vibrations of the propulsion unit.

Major natural vibrations of the propulsion unit occur in the longitudinal direction of the propulsion unit, in the transverse direction or side to side direction of the propulsion unit, and in the rotational direction of the propulsion unit or are produced as any combination of these. One or several measuring devices may be used to measure the vibrations of the propulsion unit in these three directions.

There is no need to use external actuators producing a counterforce to the vibrations in the inventive method. The counteraction will be produced within the electric motor by the auxiliary torque control signal.

DRAWINGS

Figure 2:
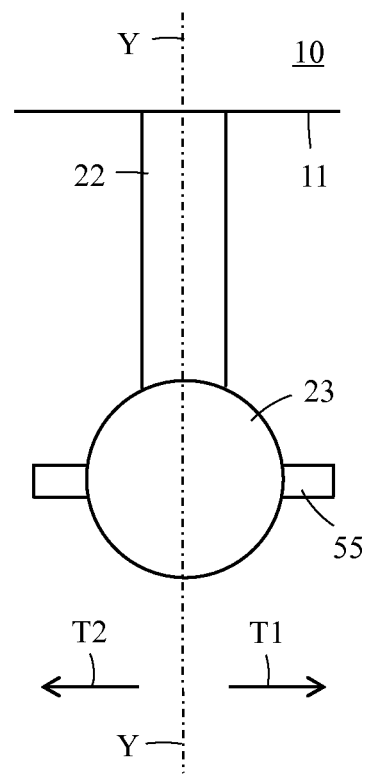
Figure 3:
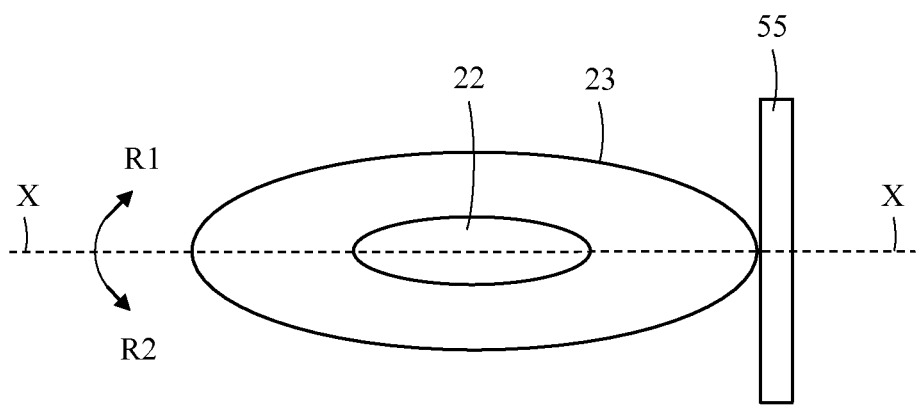
Figure 4:
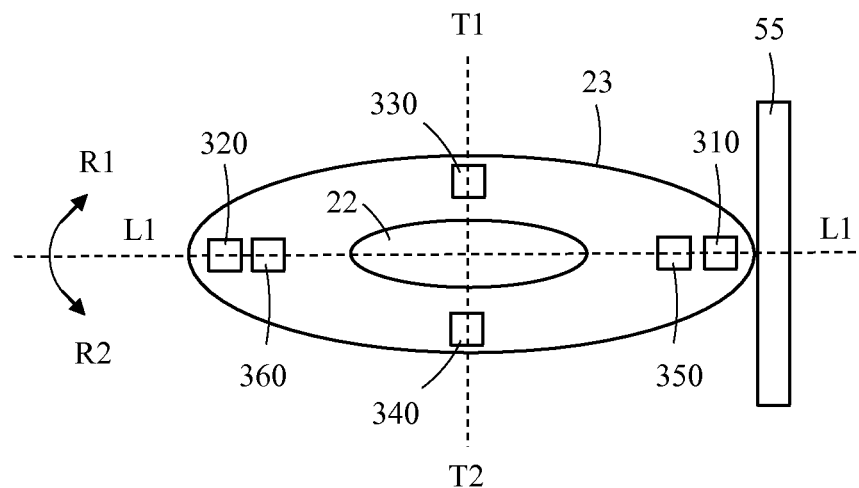
Figure 5:
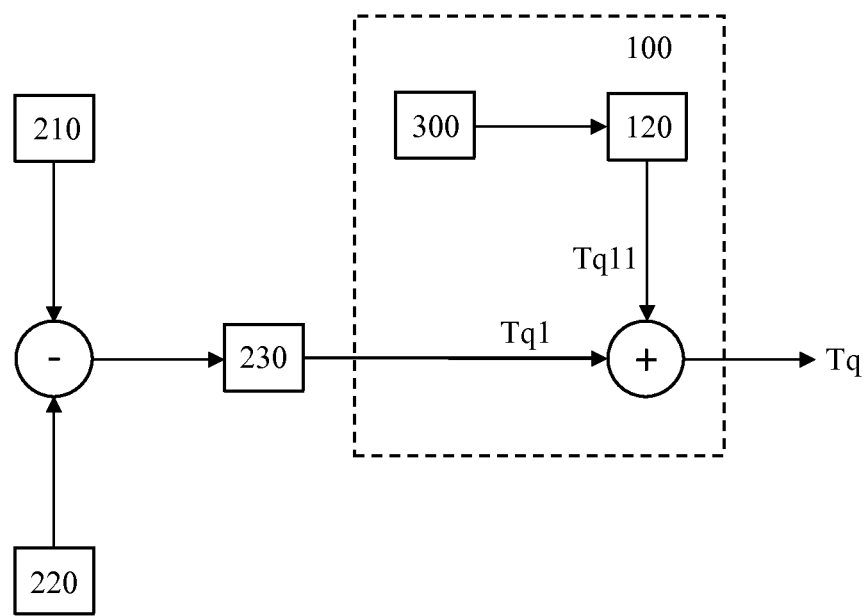
Figure 6:
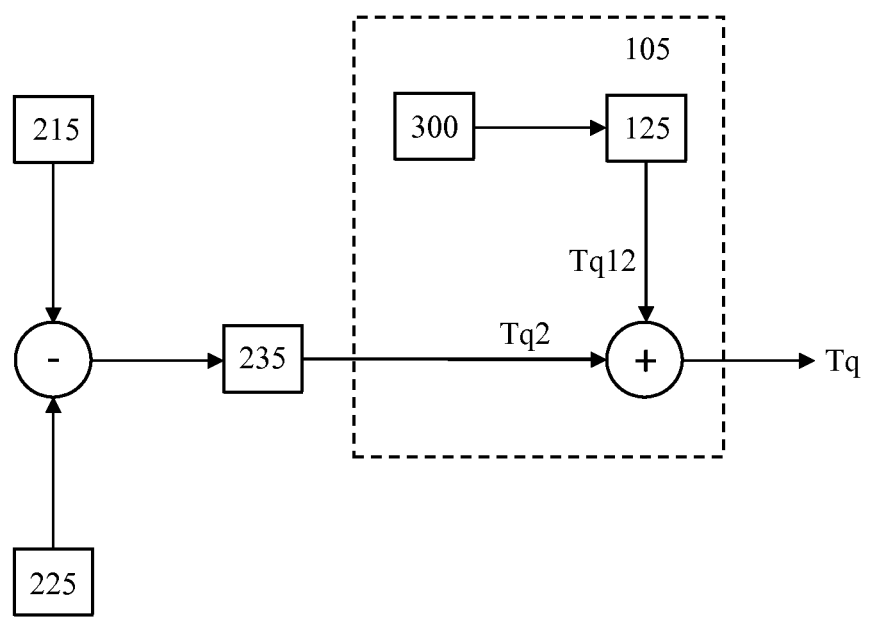

In the following the invention will be described in greater detail by means of preferred embodiments with reference to the attached drawings, in which:

FIG. 1 shows a vertical cross section in a longitudinal direction of a propulsion unit of a vessel, FIG. 2 shows a vertical cross section in a transverse direction of the propulsion unit of FIG. 1, FIG. 3 shows a horizontal cross section of the propulsion unit of FIG. 1, FIG. 4 shows a horizontal cross section of the propulsion unit of FIG. 1 provided with measuring devices, FIG. 5 shows a principal flow chart of an active vibration control of the first electric motor driving the propeller shaft of the propulsion unit, FIG. 6 shows a principal flow chart of an active vibration control of the second electric motor driving the rotation of the propulsion unit in relation to the vessel.

DETAILED DESCRIPTION

FIG. 1 shows a vertical cross section in a longitudinal direction of a propulsion unit of a vessel. The vessel 10 may have a double bottom i.e. a first outer bottom 11 forming the hull of the vessel and a second inner bottom 12. The propulsion 20 unit may comprise a frame construction 21 having an upper portion 22 and a lower portion 23.

The upper portion 22 of the frame construction 21 of the propulsion unit 20 may form an outwards from the shell 11 of the vessel 10 extending support arm. The hollow upper portion 22 of the frame construction 21 may extend essentially vertically downwards from the hull 11 of the vessel 10. The propulsion unit 20 may be rotatably attached to the vessel 10 via the upper end of the upper portion 22 of the frame construction 21 so that the propulsion unit 20 can turn 360 degrees around a centre axis Y-Y of rotation. A passage P1 may be formed in the bottom of the vessel 10 from the first outer bottom 11 to the second inner bottom 12 of the vessel 10. An upper end of the upper portion 22 of the frame construction 21 may be connected to an upper block 60. The upper block 60 may pass through the passage P1 and may be rotatably attached with a slewing bearing 61 to the hull of the vessel 10. The upper block 60 may have a generally cylindrical from. The upper block 60 may instead of being a separate part be formed by an upper end portion of the upper portion 22 of the frame construction 21. A slewing seal 62 may be positioned under the slewing bearing 61 in order to form the seal between sea water and the interior of the hull of the vessel 10.

The lower portion 23 of the frame construction 21 of the propulsion unit 20 may form an essentially horizontally extending longitudinal hollow compartment having a first end 23A and a second opposite end 23B. A propeller shaft 41 with a centre axis X-X of rotation may be positioned within the lower portion 23 of the frame construction 21. The propeller shaft 41 may be supported in the lower portion 23 of the frame construction 21 with bearings 51, 52 positioned at an axial X-X distance from each other. A propeller 55 may be attached to at least one end of the propeller shaft 41 protruding from the lower portion 23 of the frame construction 21. A first electric motor 30 may be driving the propeller shaft 41. A first end 41A of the propeller shaft 41 may be connected to the first electric motor 30 and a second end 41B of the propeller shaft 41 may protrude from an aft end 23B of the lower portion 23 of the frame construction 21. The propeller 55 may be connected to the second outer end 41B of the propeller shaft 41. The centre axis X-X of rotation of the propeller shaft 41 forms a shaft line and a longitudinal direction of the propulsion unit 20. The propeller shaft 41 may be a one piece shaft or it can be divided into several parts.

The bearings 51, 52 of the propeller shaft 41 may be positioned on axially X-X opposite sides of the first electric motor 30. The first bearing 51 at the second end 23B of the lower portion 23 of the frame construction 21 may advantageously be a radial bearing. The second bearing 52 at the second end 23A of the lower portion 23 of the frame construction 21 may advantageously be a hybrid bearing comprising a radial bearing and a slide thrust bearing or it can consist of various types and amounts of roller bearings. The slide thrust bearing or a combination of various roller bearings will take the axial loads of the propeller shaft 41.

A rotation member 70 may be positioned within the hull 11 of the vessel 10. The rotation member 70 is attached to the upper block 60. The rotation member 70 may be turned 360 degrees around the centre axis Y-Y of rotation with a second electric motor 80. The second electric motor 80 may drive the rotation member 70. The rotation member 70 may be formed by a gearwheel. The second electric motor 80 may be connected to a pinion wheel 82 through a second shaft 81 and the cogs of the pinion wheel 82 may be connected to the cogs of the gearwheel 70. There can naturally be several similar second electric motors 80 connected to the gearwheel 70. The turning of the gearwheel 70 will turn the propulsion unit 20. The gearwheel 70 may have a ring form with a hole in the middle. The cogs of the gearwheel 70 may be positioned on the outer edge or on the inner edge of the gearwheel 70.

There may further be an engine 90 within the vessel 10 and a generator 92 connected with a shaft 91 to the engine 90. The engine 90 may be a conventional combustion engine used in vessels 10. The generator 92 produces electric energy needed in the vessel 10 and the propulsion unit 20. There can be several combustion engines 90 and generators 92 in a vessel 10.

There may further be a slip ring arrangement 63 in connection with the gearwheel 70. Electric power may be transferred from the generator 92 to the slip ring arrangement 63 with a first cable 95. Electric power may further be transferred from the slip ring arrangement 63 to the first electric motor 30 with a second cable 35. The slip ring arrangement 63 is needed in order to transfer electric power between the stationary hull 11 of the vessel 10 and the rotating propulsion unit 20.

The propeller 55 may be a pulling propeller, whereby the forward direction of travel of the vessel 10 is in the direction of the arrow L1. The propeller 55 may on the other hand be a pushing propeller, whereby the forward direction of travel of the vessel 10 is in an opposite direction shown by the arrow L2. The propulsion unit 20 could also be provided with a propeller at each end of the lower portion 23 of the frame construction 21. The figure shows a single propeller 55, but the single propeller 55 could be substituted with two contra-rotating propellers.

The figure shows a longitudinal direction L1, L2 of the propulsion unit 20. The propulsion unit 20 may vibrate in the longitudinal direction L1, L2, which means that the propulsion unit 20 performs a swinging movement in the longitudinal direction L1, L2 in relation to the support point of the propulsion unit 20 at the slewing bearing 61.

FIG. 2 shows a vertical cross section in a transverse direction of the propulsion unit of FIG. 1. The figure shows a transverse direction T1, T2 of the propulsion unit 20 being perpendicular to the longitudinal direction L1, L2 of the propulsion unit 20. The propulsion unit 20 may vibrate in the transverse direction T1, T2, which means that the propulsion unit 20 performs a swinging movement in the transverse direction T1, T2 in relation to the support point of the propulsion unit 20 at the slewing bearing 61.

FIG. 3 shows a horizontal cross section of the propulsion unit of FIG. 1. The figure shows a rotational direction R1, R2 of the propulsion unit 20, whereby the propulsion unit 20 turns around the centre axis Y-Y of rotation. The propulsion unit 20 may vibrate in the rotational direction R1, R2 of the propulsion unit 20, which means that the propulsion unit 20 performs a back and forth movement around the centre axis Y-Y of rotation.

FIG. 4 shows a horizontal cross section of the propulsion unit of FIG. 1 provided with measuring devices. The propulsion unit 20 may be provided with at least one measuring device 310, 320, advantageously a first couple of measuring devices 310, 320 for measuring the longitudinal L1, L2 vibration of the propulsion unit 20. The propulsion unit 20 may further be provided with at least one measuring device 330, 340, advantageously a second couple of measuring devices 330, 340 for measuring the transverse T1, T2 vibration of the propulsion unit 20. The propulsion unit 20 may still further be provided with at least one measuring device 350, 360, advantageously a third couple of measuring devices 350, 360 for measuring the rotational R1, R2 vibration of the propulsion unit 20. This is an advantageous solution, but combined measuring devices measuring vibrations in two or more directions could also be used. The measuring devices 310, 320, 330, 340, 350, 360 are in the following generally denoted with the reference number 300.

The first couple of measuring devices 310, 320 measuring longitudinal vibrations may be positioned at the propeller shaft 41 level at opposite longitudinal ends of the longitudinal centre axis X-X within the lower portion 23 of the frame construction 21. The second couple of measuring devices 330, 340 measuring transverse vibrations may be positioned at the propeller shaft 41 level at opposite transverse sides of the vertical centre axis Y-Y within the lower portion 23 of the frame construction 21. The third couple of measuring devices 350, 360 measuring rotational vibrations may be positioned at the propeller shaft 41 level at opposite longitudinal ends of the longitudinal centre axis X-X within the lower portion 23 of the frame construction 21. The first couple of measuring devices 310, 320 and the second couple of measuring devices 330, 340 may on the other hand be positioned at the shaft line in the middle part of the lower portion 23 of the frame construction 21. The third couple of measuring devices 350, 360 may on the other hand be positioned on a slewing bearing 61 level within the vessel 10.

Any kind of measuring devices 300 being responsive to the movement of the propulsion unit 20 caused by vibrations may be used. The measuring devices 300 could e.g. be strain gauges or sensors measuring movement or acceleration or measuring devices based on laser beams or measuring devices based on cameras or video cameras. The strain gauges measure strains, whereby the movement of the propulsion unit 20 can be calculated from the measured strains. A laser beam may be positioned within the propulsion unit 20 and directed towards a light sensitive receiver. The hitting point of the laser beam on the light sensitive receiver will change when the propulsion unit 20 vibrates. The at least one measuring device 310, 320 or the first couple of measuring devices 330, 340 measuring longitudinal L1, L2 vibrations of the propulsion unit 20 may be positioned within the propulsion unit 20 on the propeller shaft 41 level. The at least one measuring device 330, 340 or the second couple of measuring devices 330, 340 measuring transverse T1, T2 vibrations of the propulsion unit 20 may be positioned within the propulsion unit 20 on the propeller shaft 41 level. This is advantageous in the sense that the propeller shaft 41 level is the level on which the longitudinal and the transverse counterforces are produced. The at least one measuring device 350, 360 or the third couple of measuring devices 350, 360 measuring rotational R1, R2 vibration of the propulsion unit 20 may be positioned on the propeller shaft 41 level or in connection with the slewing bearing 61. The measuring devices 300 could be positioned within the propulsion unit 20 or on an outer surface of the propulsion unit 20 or within the vessel 10 or on an outer surface of the vessel 10.

The periodic impulses originating from the rotating shaft line 30, 41, 51, 52 (the electric motor 30, the shaft 41, and the bearings 51, 52) and the propeller 55 are major sources of vibration in the propulsion unit 20. These impulses are due to imbalances in the rotating masses and the rotation of the propeller 55 in the water. The blades of the propeller 55 produce impulses on a blade frequency, which is the rotation speed of the propeller 55 times the number of blades of the propeller 55. Also the water flow passing along the propulsion unit 20 produces impulses. Further impulses are produced by the first electric motor 30 and the torque switching frequency of the first power converter driving the first electric motor 30. Also an adjacent propulsion unit may produce a periodic impulse to the propulsion unit. There are three important directions in which the vibrations of the propulsion unit are concentrated. The directions are the longitudinal direction L1, L2 on the propulsion unit 20, the transverse direction T1, T2 or side to side direction of the propulsion unit 20, and the rotational direction R1, R2 of the propulsion unit 20. There are also vibrations caused by any combination of the vibrations in the three directions.

FIG. 5 shows a principal flow chart of an active vibration control of the first electric motor driving the propeller shaft of the propulsion unit.

The main control circuit of the first electric motor 30 comprises a speed control followed by a rotor shaft torque control. The actual rotation speed 220 of the rotor of the first electric motor 30 and the set value 210 of the rotation speed of the rotor of the first electric motor 30 are both fed to a differentiator. The output of the differentiator i.e. the difference of the set value of the rotation speed of the rotor and the actual value of the rotation speed of the rotor is fed to the first torque controller 230. An additional first torque controller 100 is added to the torque control of the first electric motor 30. One or more measuring devices 300 measure the vibration of the propulsion unit 20 in the desired direction or directions and the measured vibration value is fed into a first active vibration controller 120. The measured vibration signal is processed and a first auxiliary torque control signal is formed in the first active vibration controller 120. The output of the first active vibration controller 120 is fed to an adder, into which adder also the output of the first torque controller 230 is fed. The output of the first active vibration controller 120 is thus added to the output of the first torque controller 230 and the output of the adder is used to control the torque of the first electric motor 30.

The emergence of vibrations is prevented and/or the emerged vibrations are attenuated by using an active vibration control acting directly on the first electric motor 30. The vibrations of the propulsion unit 20 is measured with at least one measuring device 300 in the respective directions and the output signals of the at least one measuring device 300 are used to create a first auxiliary torque control signal Tq11 which is added to the first torque control signal Tq1 produced by the first torque controller 230. The added first auxiliary torque control signal Tq11 value will either increase or decrease the first torque control signal Tq1 value produced by the first torque controller 230 in order to produce a counteraction to the vibrations within the first electric motor 30. The counteraction will attenuate the vibrations in the propulsion unit 20.

The control arrangement may comprise at least one measuring device 310, 320, advantageously a first pair of measuring devices 310, 320, measuring vibrations of the propulsion unit 20 in a longitudinal direction L1, L2 of the vessel 10. The first auxiliary torque signal Tq11 may produce a counteracting thrust with the at least one propeller 55 so that the counteracting thrust acts in an opposite direction in relation to the longitudinal L1, L2 vibrations of the propulsion unit 20, whereby said vibrations are attenuated by the counteracting thrust. The first auxiliary torque signal Tq11 will either increase or decrease the thrust that the at least one propeller 55 produces in response to the first torque signal Tq1. The thrust will be increased when the propulsion unit 20 swings in the longitudinal direction L1, L2 against the direction of the thrust and vice a versa.

The control arrangement may further comprises at least one measuring device 330, 340, advantageously a second pair of measuring devices 330, 340, measuring vibrations of the propulsion unit 20 in a transverse direction T1, T2 of the vessel 10. The first auxiliary torque signal Tq11 produces a counteracting bending moment by utilizing the rotation inertia of the first electric motor 20 and the propeller 55 so that the counteracting bending moment acts in an opposite direction in relation to the transverse T1, T2 vibrations of the propulsion unit 20, whereby said vibrations are attenuated by the counteracting bending moment. The first auxiliary torque signal Tq11 will either increase or decrease the bending moment that the first electric motor 30 produces into the propulsion unit 20 in response to the first torque signal Tq1. The bending moment will be increased when the propulsion unit 20 swings in the transverse direction T1, T2 against the direction of the bending moment and vice a versa.

The control arrangement may still further comprise at least one measuring device 310, 320, advantageously a first pair of measuring devices 310, 320, measuring vibrations of the propulsion unit 20 in a longitudinal direction L1, L2 of the vessel 10 and at least one measuring device 330, 340, advantageously a second pair of measuring devices 330, 340, measuring vibrations of the propulsion unit 20 in a transverse direction T1, T2 of the vessel 10. The measurement of vibrations of the propulsion unit 20 in the longitudinal direction L1, L2 of the vessel 10 and in the transverse direction T1, T2 of the vessel 10 may be done simultaneously and the counteracting thrust and the counteracting bending moment may be produced simultaneously.

FIG. 6 shows a principal flow chart of an active vibration control of the second electric motor driving the rotation of the propulsion unit in relation to the vessel. The active vibration control of the second electric motor corresponds to the active vibration control of the first electric motor.

The main control circuit of the second electric motor 80 comprises a speed control followed by a rotor shaft torque control. The actual rotation speed 225 of the rotor of the second electric motor 80 and the set value 215 of the rotation speed of the rotor of the second electric motor 80 are both fed to a differentiator. The output of the differentiator i.e. the difference of the set value of the rotation speed of the rotor and the actual value of the rotation speed of the rotor is fed to the second torque controller 235. A second additional torque controller 105 is added to the torque control of the second electric motor 80. One or more measuring devices 300 measure the vibration of the propulsion unit 20 in the desired direction or directions and the measured vibration value is fed into a second active vibration controller 125. The measured vibration signal is processed and a second auxiliary torque control signal is formed in the second active vibration controller 125. The output of the second active vibration controller 125 is fed to an adder, into which adder also the output of the second torque controller 235 is fed. The output of the second active vibration controller 125 is thus added to the output of the second torque controller 235 and the output of the adder is used to control the torque of the second electric motor 80.

The emergence of vibrations is prevented and/or the emerged vibrations are attenuated by using an active vibration control acting directly on the second electric motor 80. The vibrations of the propulsion unit 20 is measured with at least one measuring device 300 in the rotational directions and the output signals of the at least one measuring device 300 are used to create a second auxiliary torque control signal Tq12 which is added to the second torque control signal Tq2 produced by the second torque controller 235. The added second auxiliary torque control signal Tq12 value will either increase or decrease the second torque control signal Tq2 value produced by the second torque controller 235 in order to produce a counteraction to the vibrations within the second electric motor 80. The counteraction will attenuate the vibrations in the propulsion unit 20.

The rotational vibrations may be measured with a couple of sensors measuring acceleration. The sensors may be positioned at the shaft level at the longitudinal ends of the lower portion 23 of the frame construction. The difference of the measurement signals of the two sensors may be calculated in order to define the rotational vibration. The rotational vibration may on the other hand be determined by measuring the slewing torque of the second electric motor 80. A corresponding second auxiliary torque control signal Tq12 may then be added to the second torque control signal Tq2.

The second auxiliary torque signal Tq12 will either increase or decrease the steering torque that the second electric motor 80 produces into the propulsion unit 20 in response to the second torque signal Tq2. The steering torque will be increased when the propulsion unit 20 swings in the rotational direction R1, R2 against the direction of the rotation and vice a versa.

The control arrangement for controlling vibrations of a propulsion unit according to the invention comprises:

at least one measuring device 300 for measuring vibrations of the propulsion unit 20, a first torque controller 230 for producing a torque control signal (Tq1) to the first electric motor 30, a first additional torque controller 100 receiving as an input signal measured vibrations from the at least one measuring device (300), a first active vibration controller 120 for producing a first auxiliary torque control signal Tq11 based on the measured vibration signals, whereby the first auxiliary torque control signal Tq11 is added to a first torque control signal Tq1 produced by the first torque controller 230 of the first electric motor 30, the first auxiliary torque control signal Tq11 acting against the measured vibrations in order to attenuate said vibrations.

The method for controlling vibrations of the propulsion unit 20 according to the invention comprises:

measuring vibrations of the propulsion unit 20 with at least one measuring device 300, forming a first auxiliary torque control signal Tq11 based on the measured vibration signal, adding the first auxiliary torque control signal Tq11 to a first torque control signal Tq1 produced by a first torque controller 230 of the first electric motor 30, the first auxiliary torque signal Tq11 acting against the measured vibrations of the propulsion unit 20 in order to attenuate said vibrations.

The measured vibration signal may be filtered and a control signal may be created to be used to attenuate the vibrations by using band-pass filters which are tuned for the main natural frequency or frequencies in the respective direction of the propulsion unit 20 i.e. the longitudinal direction L1, L2, the transverse direction T1, T2 and the rotational direction R1, R2. A phase controller could also be used to control the phase of the damping torque in such a way that the measured movement i.e. the measured vibration is minimized.

The measuring devices for measuring vibrations of the propulsion unit 20 could e.g. be acceleration sensors measuring acceleration of the propulsion unit 20 in each of the directions of interest. The acceleration being caused by vibrations of the propulsion unit 20 in the respective directions would then be measured with the acceleration sensors. The outputs of the acceleration sensors could be passed through an integrator, whereby the output of the integrator would represent the velocity of the vibrations. The output of the integrator could then be directed through a band-pass filter tuned for the main natural frequency or frequencies in the respective direction. The output of the band-pass filter could then be used as an auxiliary torque control signal Tq2 in order to increase or decrease the torque control signal Tq1, Tq2 produced by the torque controller 230, 235 of the electric motor 30, 80 and thereby attenuate the vibrations.

The dynamic movement of the propulsion unit 20 can be expressed with the following equation (1):

$$m\ddot{u}+c\dot{u}+ku=F(t) \quad (1)$$

where u denotes the displacement of the propulsion unit 20 in a respective direction, $\dot{u}$ denotes the velocity of the propulsion unit 20 in the respective direction, $\ddot{u}$ denotes the acceleration of the propulsion unit 20 in the respective direction, m denotes the mass of the propulsion unit 20, c denotes the damping of the propulsion unit 20, k denotes the stiffness of the propulsion unit 20, and F (t) denotes the force as a function of time.

The output signal of the band-pass filter representing the velocity it of the propulsion unit 20 in a respective direction can be used to control the velocity factor in equation (1). The idea is to influence the vibrations of the propulsion unit 20 e.g. by calculating from the measured vibration the velocity depended force. The propulsion unit 20 will see this velocity depended force as an increase in damping, which will attenuate the vibration.

A propulsion unit 20 may suffer e.g. from two main natural frequencies in the longitudinal direction L1, L2 and from one main natural frequency in the transverse direction T1, T2. The main natural frequencies in the longitudinal direction could be 3.6 Hz and 7.5 Hz and the main natural frequency in the transverse direction could be 5 Hz.

This situation could easily be handled by producing separate auxiliary torque signals for both directions. The auxiliary torque signal for control of the longitudinal vibration will be active on the longitudinal vibration frequencies 3.6 Hz and 7.5 Hz and inactive on the transverse vibration frequency 5 Hz. The auxiliary torque signal for control of the transverse vibration will be active on the transverse vibration frequency 5 Hz and inactive on the longitudinal vibration frequencies 3.6 Hz and 7.5 Hz. There will be none or only limited interference between the auxiliary torque signals in the two directions.

It is, however, possible to use the invention also in a situation where some of the longitudinal vibration frequencies are very near to some of the transverse vibration frequencies. This could be handled by multivariable control techniques. The algorithms would receive simultaneously the vibration signals in the longitudinal direction and in the transverse direction and calculate a suitable combined auxiliary torque control signal based on the vibration signals in both directions.

The invention can be implemented into practice by first measuring the vibrations in the respective three directions in the vessel. Suitable band-pass filters are thereafter selected for each direction. The auxiliary torque control signal for each direction is thereafter formed and tested in the vessel provided with the propulsion unit or propulsion units in order to tune the band-pass filter and in order to determine a proper amplification for the auxiliary torque control signal.

The auxiliary torque signal value may be rated to a range of 1 to 20% and advantageously to a range of 1 to 3% of the maximum torque value produced by the torque controller 230, 235 of the respective electric motor 30, 80.

The invention may be used in connection with electric motors 30, 80 being driven by a power converter. The power converter may comprise a rectifier rectifying the three phase AC grid voltage into a DC voltage, an intermediate circuit, and an inverter converting the DC voltage in the intermediate circuit into a three phase AC voltage to be supplied to the electric motor. The torque controller 230, 235 controls the inverter in the power converter. The power converter may be controlled by frequency control, by flux control or by direct torque control (DTC). The DTC comprises a speed control and a torque control. The torque control in DTC is based on an adaptive motor model. The DTC provides for a very fast control of the electric motor 30, 80.

The electric motor 30, 80 may be an induction motor e.g. a synchronous electric motor with a permanent magnet rotor.

The first electric motor 30 is in the figures positioned within the lower portion 23 of the frame construction 21 of the propulsion unit 20. Another possibility would be to position the first electric motor 30 in the upper portion 22 of the frame construction 21. A vertical shaft could pass from the first electric motor 30 down to the propeller shaft 41. The lower end of the vertical shaft could be connected with a transmission to the propeller shaft 41. A third possibility would be to position the first electric motor 30 within the hull of the vessel 10. The first electric motor 30 within the vessel 10 could be connected to a vertical shaft passing down to the propeller shaft 41 and being connected with a transmission to the propeller shaft 41.

The axis of rotation Y-Y of the propulsion unit 20 is vertical in the figures, but this need not be the case. The axis of rotation Y-Y of the propulsion unit 20 may form a small angle in the range of 0 to 5 degrees with the vertical direction. The axis of rotation X-X of the propeller shaft 41 is horizontal in the figures, but this need not be the case. The axis of rotation X-X of the propeller shaft 41 may form a small angle in the range of 0 to 10 degrees with the horizontal direction. The angle $\alpha 1$ between the axis of rotation X-X of the propeller shaft 41 and the axis of rotation Y-Y of the propulsion unit 20 is perpendicular in the figures, but this need not be the case. Said angle $\alpha 1$ could deviate from 90 degrees.

The propulsion unit 20 disclosed in the figures is an azimuthing propulsion unit, which can be rotated full 360 degrees. The invention can naturally also be used in a stationary propulsion unit, whereby the propulsion unit it fixedly attached to the hull of the vessel. A vessel may be provided with one or more azimuthing propulsion units and/or one or more stationary propulsion units.

The invention and its embodiments are not limited to the examples described above but may vary within the scope of the claims.

The invention claimed is:

1. A method for controlling vibrations of a propulsion unit of a vessel, the propulsion unit comprising:
    a frame construction having an upper portion and a lower portion, the upper portion forming an outwards from a hull of the vessel protruding support arm, the lower portion forming a longitudinal compartment having a first end and a second opposite end,
    a propeller shaft being positioned within the lower portion of the frame construction,
    at least one propeller being attached to the propeller shaft,
    a first electric motor driving the propeller shaft, the method comprising:
measuring vibrations of the propulsion unit with at least one measuring device,
forming a first auxiliary torque control signal based on the measured vibration signal,
adding the first auxiliary torque control signal to a first torque control signal produced by a first torque controller of the first electric motor, the first auxiliary torque control signal acting against the measured vibrations in order to attenuate said vibrations.

2. The method according to claim 1, further comprising measuring the vibrations of the propulsion unit in a longitudinal direction of the vessel and by producing with the first auxiliary torque signal a counteracting thrust with the at least one propeller, said counteracting thrust acting in an opposite direction in relation to the longitudinal vibrations of the propulsion unit, whereby said vibrations are attenuated by the counteracting thrust.

3. The method according to claim 1, further comprising measuring the vibrations of the propulsion unit in a transverse direction of the vessel and by producing with the first auxiliary torque signal a counteracting bending moment by utilizing the rotation inertia of the first electric motor and the propeller, said counteracting bending moment acting in an opposite direction in relation to the transverse vibrations of the propulsion unit, whereby said vibrations are attenuated by the counteracting bending moment.

4. The method according to claim 2, further comprising measuring vibrations of the propulsion unit in the longitudinal direction of the vessel and in the transverse direction of the vessel simultaneously and producing the counteracting thrust and the counteracting bending moment simultaneously.

5. The method according to claim 1, wherein the propulsion unit further comprises:
a rotation member within the hull of the vessel, said rotation member being connected to an upper end of the upper portion of the frame construction, and
at least one second electric motor being connected to the rotation member, the propulsion unit being rotatable around a centre axis of rotation via the rotation member with at least one second electric motor,
the method further comprising:
measuring vibrations of the propulsion unit in a rotational direction of the propulsion unit with at least one measuring device,
forming a second auxiliary torque control signal based on the measured vibration signal,
adding the second auxiliary torque control signal to a second torque control signal produced by a second torque controller of the second electric motor, the second auxiliary torque control signal acting against the measured vibrations in order to attenuate said vibrations.

6. The method according to claim 1, further comprising rating the first auxiliary torque control signal to a value in the range of 1 to 20% of the maximum torque value produced by the first torque controller of the first electric motor and by rating the second auxiliary torque control signal to a value in the range of 1 to 20% of the maximum torque value produced by the second torque controller of the second electric motor.

7. The method according to claim 1, further comprising rating the first auxiliary torque control signal to a value in the range of 1 to 3% of the maximum torque value produced by the first torque controller of the first electric motor and by rating the second auxiliary torque control signal to a value in the range of 1 to 3% of the maximum torque value produced by the second torque controller of the second electric motor.

8. The method according to claim 1, further comprising using at least one measuring device for measuring longitudinal vibration of the propulsion unit and by using at least one measuring device for measuring transverse vibration of the propulsion unit and positioning said measuring devices on the propeller shaft level within the propulsion unit.

9. The method according to claim 1, further comprising using at least one measuring device for measuring rotational vibration of the propulsion unit and positioning said at least one measuring device on the propeller shaft level within the propulsion unit or on a slewing bearing level within the vessel.

10. A control arrangement for controlling vibrations of a propulsion unit of a vessel, the propulsion unit comprising:
a frame construction having an upper portion and a lower portion, the upper portion forming an outwards from a hull of the vessel protruding support arm, the lower portion forming a longitudinal compartment having a first end and a second opposite end,
a propeller shaft being positioned within the lower portion of the frame construction,
at least one propeller being attached to the propeller shaft,
a first electric motor driving the propeller shaft,
the control arrangement comprising:
at least one measuring device for measuring vibrations of the propulsion unit,
a first torque controller for producing a torque control signal to the first electric motor,
a first additional torque controller receiving as an input signal measured vibrations from the at least one measuring device,
a first active vibration controller for producing a first auxiliary torque control signal based on the measured vibration signals, whereby
the first auxiliary torque control signal is added to a first torque control signal produced by the first torque controller of the first electric motor, the first auxiliary torque control signal acting against the measured vibrations in order to attenuate said vibrations.

11. The control arrangement according to claim 10, wherein the arrangement comprises at least one measuring device measuring vibrations of the propulsion unit in a longitudinal direction of the vessel, whereby the first auxiliary torque signal produces a counteracting thrust with the at least one propeller, said counteracting thrust acting in an opposite direction in relation to the longitudinal vibrations of the propulsion unit, whereby said vibrations are attenuated by the counteracting thrust.

12. The control arrangement according to claim 10, wherein the arrangement comprises at least one measuring device measuring vibrations of the propulsion unit in a transverse direction of the vessel, whereby the first auxiliary torque signal produces a counteracting bending moment by utilizing the rotation inertia of the first electric motor and the propeller, said counteracting bending moment acting in an opposite direction in relation to the transverse vibrations of the propulsion unit, whereby said vibrations are attenuated by the counteracting bending moment.

13. The control arrangement according to claim 11, wherein the arrangement comprises at least one measuring device measuring vibrations of the propulsion unit in a longitudinal direction of the vessel and at least one measuring device measuring vibrations of the propulsion unit in a transverse direction of the vessel, whereby measurement of vibrations of the propulsion unit in the longitudinal direction of the vessel and in the transverse direction of the vessel is done simultaneously and the counteracting thrust and the counteracting bending moment are produced simultaneously.

14. The control arrangement according to claim 10, wherein the propulsion unit further comprises:
- a rotation member within the hull of the vessel, said rotation member being connected to an upper end of the upper portion of the frame construction, and
- at least one second electric motor being connected to the rotation member, the propulsion unit being rotatable around a centre axis of rotation via the rotation member with the at least one second electric motor, the control arrangement further comprising:
- at least one measuring device for measuring vibrations of the propulsion unit in a rotational direction,
- a second torque controller for producing a second torque control signal to the second electric motor,
- a second additional torque controller receiving as an input signal measured vibrations from the at least one measuring device,
- a second active vibration controller for producing a second auxiliary torque control signal based on the measured vibration signals, whereby the second auxiliary torque control signal is added to the second torque control signal produced by the second torque controller of the second electric motor, the second auxiliary torque control signal acting against the measured vibrations in order to attenuate said vibrations.

15. The control arrangement according to claim 13, wherein the measuring devices measuring the longitudinal and the transverse vibration of the propulsion unit are positioned within the propulsion unit on the propeller shaft level.

16. The method according to claim 3, further comprising measuring vibrations of the propulsion unit in the longitudinal direction of the vessel and in the transverse direction of the vessel simultaneously and producing the counteracting thrust and the counteracting bending moment simultaneously.

17. The method according to claim 16, wherein the propulsion unit further comprises:
- a rotation member within the hull of the vessel, said rotation member being connected to an upper end of the upper portion of the frame construction, and
- at least one second electric motor being connected to the rotation member, the propulsion unit being rotatable around a centre axis of rotation via the rotation member with at least one second electric motor, the method further comprising:
measuring vibrations of the propulsion unit in a rotational direction of the propulsion unit with at least one measuring device,
forming a second auxiliary torque control signal based on the measured vibration signal,
adding the second auxiliary torque control signal to a second torque control signal produced by a second torque controller of the second electric motor, the second auxiliary torque control signal acting against the measured vibrations in order to attenuate said vibrations.

18. The method according to claim 4, wherein the propulsion unit further comprises:
- a rotation member within the hull of the vessel, said rotation member being connected to an upper end of the upper portion of the frame construction, and
- at least one second electric motor being connected to the rotation member, the propulsion unit being rotatable around a centre axis of rotation via the rotation member with at least one second electric motor, the method further comprising:
measuring vibrations of the propulsion unit in a rotational direction of the propulsion unit with at least one measuring device,
forming a second auxiliary torque control signal based on the measured vibration signal,
adding the second auxiliary torque control signal to a second torque control signal produced by a second torque controller of the second electric motor, the second auxiliary torque control signal acting against the measured vibrations in order to attenuate said vibrations.

19. The method according to claim 18, further comprising rating the first auxiliary torque control signal to a value in the range of 1 to 20% of the maximum torque value produced by the first torque controller of the first electric motor and by rating the second auxiliary torque control signal to a value in the range of 1 to 20% of the maximum torque value produced by the second torque controller of the second electric motor.

20. The method according to claim 19, further comprising rating the first auxiliary torque control signal to a value in the range of 1 to 3% of the maximum torque value produced by the first torque controller of the first electric motor and by rating the second auxiliary torque control signal to a value in the range of 1 to 3% of the maximum torque value produced by the second torque controller of the second electric motor.

* * * * *